June 17, 1958  L. E. DEAN  2,839,337
PEBBLE HEAT EXCHANGER
Filed Dec. 21, 1953
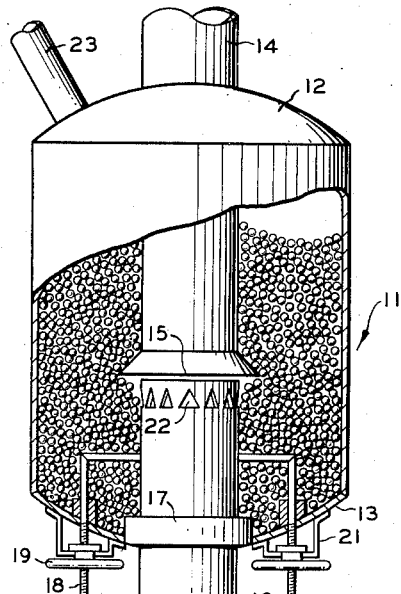
FIG. 1
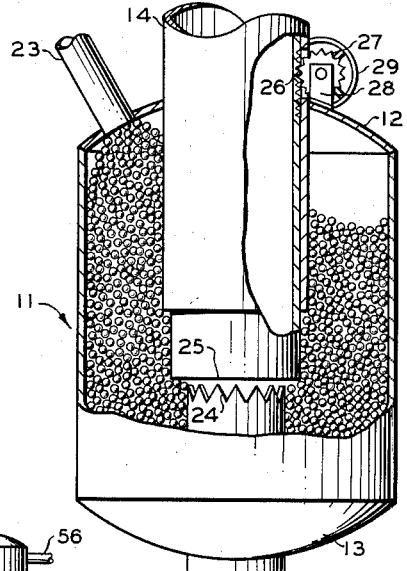
FIG. 2
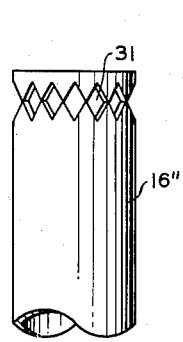
FIG. 3
FIG. 4
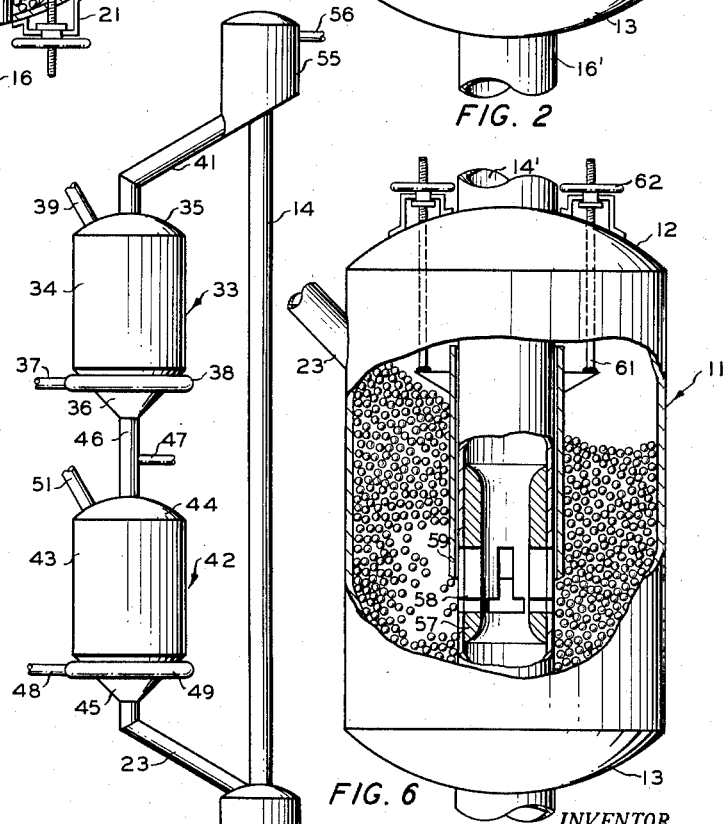
FIG. 5
FIG. 6
INVENTOR.
L. E. DEAN
BY Hudson and Young
ATTORNEYS United States Patent Office 2,839,337
Patented June 17, 1958

2,839,337

PEBBLE HEAT EXCHANGER

Lloyd E. Dean, Bartlesville, Okla., assignor to Phillips Petroleum Company, a corporation of Delaware Application December 21, 1953, Serial No. 399,329

20 Claims. (Cl. 302—17)

This invention relates to pebble heat exchangers. In one of its more specific aspects, it relates to pebble heat exchanger apparatus. In another of its more specific aspects, it relates to an improved means for controlling the movement of pebbles through a pebble heat exchanger. In another of its more specific aspects, it relates to a means for feeding pebbles into a gas lift-type elevator. In another of its more specific aspects, it relates to a method for entraining pebbles in a gas lift-type elevator.

This application is a continuation-in-part of my application Serial No. 309,252, filed September 12, 1952, now abandoned.

Heat exchangers of the so-called "pebble heater" type have been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce variable products such as ethylene and acetylene, as well as for other reactions and purposes. Conventional pebble heater type apparatus includes two refractory lined contacting chambers disposed one above the other and connected by a refractory lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between ¼ inch to ⅜ inch are preferred. The pebbles must be formed of a refractory material which will stand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to the desired temperature generally in the range of 1400° F. to 3200° F. The hot pebbles are thereafter contacted with the fluid to be superheated or reacted, as the case may be, in the other chamber. Generally, pebble inlet temperatures in the lower chamber are about 50° F. to 200° F. below the highest temperature of the pebbles within the upper chamber. In processes for the production of ethylene from light hydrocarbons, such as ethane, propane, or butane, the pebble temperature in the reaction chamber is usually in the range of 1200° F. to 1800° F. For the production of acetylene by pyrolysis of hydrocarbons, temperatures in the range of 1600° F. to 3000° F. are desirable.

In the past, considerable trouble has been encountered in obtaining fine and critical control of the flow of pebbles into an elevator utilized for returning the pebbles from the lower end of the lowermost chamber to the upper end of the uppermost chamber. Conventional feeding mechanisms which have been used for providing controlled flow of pebbles from the lower end portion of pebble heat exchangers include star valves, gate valves, vibratory feeders and rotatable table feeders. These conventional feeders have normally been positioned within the conduit extending between the lower end portion of the lowermost pebble heat exchange chamber and the pebble elevator. These pebble feeders were initially used in connection with mechanical pebble elevators. More recent practice in pebble heat exchangers has been to utilize a gas lift for the purpose of elevating pebbles to the uppermost pebble heat exchange chamber. Trouble has been encountered, when using the conventional feeders, in obtaining uniform flow and entrainment of the pebbles without subjecting these pebbles to considerable mechanical shock during the initial entrainment thereof. It has also been difficult to obtain different closely controllable rates of pebble flow in the gas lift-type elevator. I have devised a means whereby a closer control of pebble flow is obtained with a smaller amount of mechanical shock to the pebbles. Control of pebble flow in this manner, unexpectedly reduces abrasion of the conduit extending between the reaction chamber and the gas lift. It is also possible to obtain a very close control and variation of the pebble flow in a gas lift-type elevator.

Each of the following objects of the invention is attained by at least one aspect of this invention.

An object of this invention is to provide improved pebble heat exchange apparatus. Another object of the invention is to provide improved pebble feeding means. Another object of the invention is to provide means for controlling the volume flow of pebbles to a pebble elevator. Another object of the invention is to provide means for entraining pebbles in a gas lift-type elevator with a minimum of mechanical shock to the pebbles. Another object of the invention is to provide an improved means for entraining pebbles at a controlled flow rate in a gas lift-type elevator. Other and further objects and advantages will be apparent to those skilled in the art upon study of the accompanying discussion and the drawings.

Broadly speaking, this invention comprises a means and method for controlling the rate of flow of solid particles, such as pebbles, into a gas lift. A chamber is connected in its upper end portion to the pebble outlet of the lowermost chamber of a pebble heater. A conduit extends upwardly through that chamber and terminates in a second chamber which is positioned on a level above the uppermost chamber of the pebble heater. Openings which have individual portions thereof extending in a direction longitudinal with respect to the gas lift conduit and which are smaller in cross section than other portions of the same openings are provided in said conduit and positioned within the chamber surrounding the lower portion thereof. Means are provided for closing off portions of these openings, preferably closing from the portion of smaller cross section to the portion of larger cross section. In a preferred modification, a single conduit extends through the pebble entrainment chamber and a sleeve is provided about the conduit so as to effectively close the portions of the passages into said conduit. The conduit is provided with a constriction member, preferably of a venturi type, in the section provided with the openings from the chamber into the conduit. In another modification, the conduit through this lower chamber is broken into two sections, the lowermost section comprising a lift gas inlet conduit and the uppermost section comprising an elevator conduit section. When such a modification is used, a plurality of openings or serrations is provided at a given level within the lower end of the elevator conduit or the upper end of the lift gas inlet conduit. In another modification, a section of the lift gas conduit is slideably affixed in the lower end of the chamber so as to permit the movement of the openings or serrations with respect to the lower end of the elevator conduit. When two conduit sections are used in this manner, it is preferred that the lower end of the elevator conduit be larger in diameter than the lift gas inlet conduit. In another modification, a sleeve may be provided within or about the lower end portion of the gas lift conduit so as to permit the adjustment of the sleeve vertically with respect to the openings or serrations.

Better understanding of this invention will be obtained upon study of the accompanying schematic drawings in which:

Figure 1 is a diagrammatic representation of a pebble entraining chamber showing the relative position of the lower end of the gas lift conduit and the upper end portion of the lift gas inlet conduit.

Figure 2 is a broken section showing portions of the pebble entraining chamber and a modification of the gas lift conduit and lift gas inlet conduit.

Figure 3 is an another modification of the upper end section of a lift gas inlet conduit of this invention.

Figure 4 is another modification of the upper end section of a lift gas inlet conduit of this invention.

Figure 5 is a schematic view of pebble heater apparatus of this invention.

Figure 6 is a schematic view of a preferred modification of the pebble entraining chamber and elevator conduit of this invention.

Referring particularly to Figure 1 of the drawings, upright, elongated shell 11, closed at its upper and lower ends by closure members 12 and 13, respectively, encompasses the lower end portion of gas lift conduit 14. The lower end portion of gas lift conduit 14 may be belled, as shown at 15, or the entire length of this conduit may be of a diameter substantially larger than the lift gas inlet conduit, as shown in Figure 2. Lift gas inlet conduit 16 extends upwardly into the lower end of chamber 11, preferably being longitudinally disposed therein through seal collar 17. Displacement members 18 extend upwardly through the bottom of chamber 11 and are affixed to conduit 16 so as to move that conduit along its axis in response to the movement of drive members 19, such as hand wheels, which are threadedly connected to the lower end portions of displacement members 18 and are rotatably maintained in place with respect to the bottom of chamber 11 by means of retainer members 21 connected to closure member 13.

Triangular openings 22 are provided in the upper end portion of lift gas inlet conduit 16, the apex of the triangular openings being at the upper end of the triangular openings. Pebble inlet conduit 23 is connected to the upper end portion of chamber 11.

Referring particularly to Figure 2 of the drawings, parts like those shown in Figure 1 are designated by like numerals. In this modification, lift gas inlet conduit 16' is preferably fixed in closure member 13 of shell 11 and is provided with serrations 24 along the upper edge thereof. Gas lift conduit 14 is coaxially disposed with respect to lift gas inlet conduit 16' and is also fixed in position in closure member 12 of chamber 11. Sleeve member 25 is slidably positioned within the lower end of gas lift conduit 14 so as to closely fit therein. Sleeve member 25 is provided with a gear race 26 longitudinally disposed along one of its sides and is operatively connected to pinion 27, which extends through the wall of conduit 14 and is supported by support member 28 which may be rigidly affixed to closure member 12 of chamber 11 or to conduit 14. Drive wheel 29 is connected to pinion 27 so as to actuate that pinion so that it may in turn drive gear race 26 and sleeve 25 longitudinally through conduit 14.

Referring particularly to the device shown as Figure 3 of the drawings, lift gas inlet conduit 16" is provided with diamond shaped openings 31 with points thereof extending toward the top and toward the bottom of that conduit.

Referring particularly to Figure 4, lift gas inlet conduit 16''' is provided with openings which may be substantially flat in their lower ends and extend upwardly as a plurality of arch-like openings 32 disposed about the upper end of that conduit.

Referring particularly to Figure 6 of the drawings, conduit 14' extends upwardly through the entire length of chamber 11, the lower portion of conduit 14' being adapted as a lift gas inlet conduit. Provided within conduit 14' is a constriction member 57 which may be of a venturi type. This constriction member is of such length that it extends at least from the lower end of openings 58 to the upper ends thereof. It is preferred, however, that this constriction member extend a substantial distance above and below openings 58 so as to provide a smoother flow of gas past openings 58. Openings 58 comprise inverted T-type openings which are cut through conduit 14' and the constriction member 57. Surrounding a portion of conduit 14' within chamber 11 is sleeve member 59 which is moveable longitudinally with respect to conduit 14'. This sleeve member is moveable by means of hanger members 61 which may be threaded in their upper ends, as shown, and operatively motivated by drive members 62. If desired, sleeve member 59 can be motivated from the lower end of chamber 11 by similar hanger members.

A less desirable modification of this type structure may be made by using normally positioned T-type openings in a conduit such as shown in Figure 6, in which case sleeve member 59 would be positioned so as to approach openings 58 from the lower end portion, thus first closing off the lower portion thereof and gradually approaching the section of openings 58 which have the greatest cross section.

Referring particularly to the device shown as Figure 5 of the drawings, pebble heater chamber 33 comprises upright, elongated shell 34 closed at its upper and lower ends by closure members 35 and 36, respectively. Gaseous material inlet conduit 37 is connected by means of header member 38 to the lower end of shell 33. Gaseous effluent outlet conduit 39 is provided in the upper end portion of chamber 33 and pebble inlet conduit 41 is also connected to the upper end of shell 33. Inlet conduit 41 may be connected to chamber 33 as a single conduit, as shown, or may be connected through a header member or surge chamber to the upper end of chamber 33 by means of a plurality of conduits. Reaction chamber 42 comprises upright, elongated shell 43, closed at its upper and lower ends by closure members 44 and 45, respectively. Pebble conduit 46 extends between the lower end of chamber 33 and the upper end of chamber 42. Alternatively, a plurality of conduits 46 may be utilized, if desired. Seal gas inlet conduit 47 is connected to pebble conduit 46 intermediate its ends. Gaseous material inlet conduit 48 is connected by means of header member 49 to the lower end portion of chamber 42. Gaseous effluent outlet conduit 51 extends from the upper end portion of chamber 42. Pebble outlet conduit 23 extends downwardly from the lower end of chamber 42 to the upper end portion of chamber 11. In the modification wherein conduits 16, 16', 16" and 16''' are longitudinally displaceable in the lower end of chamber 11, a slip joint is provided at 52 so as to permit the movement of that conduit section therein and so as to maintain a gas-tight connection between that conduit section and the conduit section upstream thereof. Flow control valve 53 is provided in the lift gas inlet conduit section 54 upstream of section 16. Elevator conduit 14 extends upwardly from pebble entrainment chamber 11 into gas-pebble separator chamber 55 which is provided with gaseous effluent outlet conduit 56 in its upper end portion and is connected at its lower end to the upper end of pebble inlet conduit 41.

In the operation of the devices shown in the drawings, pebbles are introduced into the upper end of chamber 33 through pebble inlet conduit 41 and form a contiguous, gravitating pebble mass in that chamber. Gaseous heating material is introduced into the lower end portion of chamber 33 through inlet conduit 37 and header member 38. The gaseous heating material may be a preheated gas, such as combustion products, or may be fuel and air which are burned in the lower end portion of chamber 33. The gaseous heating material passes upwardly through the contiguous gravitating pebble mass within that chamber, raising the pebbles to the desired temperature by direct heat exchange therewith. Gaseous effluent is removed from the upper end of chamber 33 through conduit 39. The hot pebbles are gravitated through conduit 46 into the upper end portion of chamber 42, forming a contiguous gravitating pebble mass through that chamber. Gaseous material to be heated or converted within chamber 42 is introduced into the lower end portion of that chamber through inlet conduit 48 and header member 49. That gaseous material passes upwardly through the contiguous gravitating pebble mass in that chamber, being raised to the desired temperature necessary for the reaction thereof or for the desired heating thereof, as the case may be. Gaseous effluent is removed from the upper end portion of chamber 42 through gaseous effluent outlet conduit 51.

Pebbles are gravitated from the lower end of chamber 42 through conduit 23 into the upper end portion of chamber 11. The pebbles form a contiguous pebble mass within that chamber. Inasmuch as the lower end portion of conduit 14 is larger in diameter than sections 16, 16', 16" or 16''', and inasmuch as sleeve member 59, as shown in Figure 6, is larger in diameter than conduit 14', the pebbles, when permitted to do so, flow downwardly and inwardly through the open portion into the interior of conduit 14 or 14'. The position which this pebble mass tends to assume is that of the normal angle of repose. As sleeve member 59, or as lift gas inlet conduit section 16, are moved so as to enlarge the portion of the openings available to flow of pebbles, the pebbles gravitate through the openings into the interior of conduit 14 or 14', and become entrained in the stream of lift gas passing through that conduit. The pebbles are thus elevated through conduit 14 or 14' into gas-pebble separator chamber 55 wherein the gas and pebbles are separated, the gas being removed through effluent conduit 56 and the pebbles gravitating through conduit 41 into the upper end of chamber 33. As the lift gas inlet conduit, as shown in Figure 1, is further lowered, the additional area of each inlet opening increment which is made available for pebble flow is progressively less for each given movement thereof than the next preceding open increment. In this manner, I have achieved an increasing sensitivity of pebble flow adjustment by the means of the device of this invention.

I likewise achieve very close control of the flow of pebbles into the elevator conduit, as shown in Figure 6 of the drawings, by means of a sleeve surrounding conduit 14' within chamber 11. This sleeve may or may not be spaced from conduit 14'. By the adjustment of sleeve 59 in a longitudinal direction the level at which the pebbles tend to take the normal angle of repose is varied. The lower portions of the inverted T-type openings 58 are of sufficiently large cross section to permit the minimum pebble flow necessary to the operation of the pebble heater. As additional pebble flow is required to increase the temperature within the reactor chamber, or for some other reason, sleeve member 59 is raised so as to make available to pebble flow additional portions of the T-type openings, which portions are smaller in lateral cross section than are the wider bottom portions thereof. These narrower opening portions permit very close control of pebble flow into conduit 14'.

The operation of this apparatus utilizing the openings 32 shown in Figure 4 is substantially the same as that shown and described in connection with Figure 1 of the drawings except that the control is not quite as sharp. In this type of operation, there is practically no opportunity for the pebbles to bridge, for there is always a portion of the opening extending above the top of the pebble bed.

In a less desirable form, but one which also gives close control of the pebble flow, the upper edge of the lift gas inlet conduit is serrated. In the operation of the type device shown in Figure 2 of the drawings, sleeve 25 is lowered so that the normal angle of repose of the pebbles is below the lower ends of the serrations. The sleeve 25 is then raised so as to permit the desired flow of pebbles through the serrations into the gas stream flowing through conduit section 16' and conduit 14. Very close adjustment of the flow of pebbles can be obtained by lowering sleeve member 25 after obtaining more pebble flow through the serrations than is desired.

The openings 31, shown in Figure 3 of the drawings, permit control of pebble flow either by raising the level of pebbles with respect to the openings so as to place that level above the widest opening portion, or so as to lower the level of pebbles below the broadest horizontal opening portion. It should be noted that operation of this modification can also be obtained by placing a sleeve within conduit section 16" and raising or lowering that sleeve so as to progressively open or close portions of those openings.

Various modifications of this invention will be apparent to those skilled in the art upon study of the accompanying disclosure. Such modifications are believed to be clearly within the skill of the art and thus within the spirit and scope of this disclosure.

I claim:

1. An improved pebble feeder comprising, in combination, a closed, upright, elongated shell; pebble inlet means in the upper end portion of said shell; pebble entrainment means extending through said shell and comprising an elevator conduit section open in its lower end, a lift gas inlet conduit section coaxially disposed with respect to said elevator conduit section and open on its upper end, said lift gas inlet being the sole means for introducing lift gas into said elevator conduit, passage means from the interior of said shell into an in-line passage formed by said elevator conduit section and said lift gas inlet conduit section, on a horizontal plane intermediate the ends of said shell, each of said passage means having a smaller area at one end than the opposite end; means adapted to control the area of each of said passage means through which pebbles are permitted to pass and drive means containing at least one rotary moving part in the operation of which two surfaces slide with respect to each other, all of said rotary moving parts being located outside said closed, elongated shell.

2. The pebble feeder of claim 1 wherein each of said passage means are of diminishing area in the direction of the upper end of said gas lift inlet conduit section.

3. The pebble feeder of claim 2 wherein each of said passage means are triangular in shape.

4. The pebble feeder of claim 2 wherein each of said passage means are arch-like.

5. The pebble feeder of claim 2 wherein said lift gas inlet conduit section is smaller in diameter than the lower end of said elevator conduit section and is slidably positioned in the lower end of said shell; and said means to control the area of each of said passage means through which pebbles are permitted to pass comprises drive means connected to said lift gas inlet conduit section so as to move said lift gas inlet conduit section axially within the lower end of said shell.

6. The pebble feeder of claim 2 wherein said means to control the area of each of said passage means through which pebbles are permitted to pass comprises a sleeve slidably engaging the lower end portion of said elevator conduit section, the upper end of said sleeve being disposed above said pebble inlet means; said drive means being operatively connected to said sleeve so as to longitudinally displace said sleeve with respect to the upper end of said lift gas inlet conduit section.

7. The pebble feeder of claim 1 wherein each of said passage means having decreasing areas comprise serrations in the upper end of said lift gas inlet conduit section.

8. The pebble feeder of claim 7 wherein said lift gas inlet conduit section is slidably positioned in the lower end of said shell; and said means to control the area of each of said passage means through which pebbles are permitted to pass comprises drive means connected to said lift gas inlet conduit section so as to move said lift gas inlet conduit section axially within the lower end of said shell.

9. The pebble feeder of claim 7 wherein said means to control the area of each of said passage means through which pebbles are permitted to pass comprises a sleeve slidably engaging the lower end portion of said elevator conduit section; and drive means operatively connected to said sleeve so as to longitudinally displace said sleeve with respect to the upper end of said lift gas inlet conduit section.

10. The pebble feeder of claim 1 wherein said lift gas inlet conduit section is smaller in diameter than the lower end of said elevator conduit section.

11. The pebble feeder of claim 10 wherein said lift gas inlet conduit section is slidably positioned in the lower end of said shell; and said means to control the area of each of said passage means through which pebbles are permitted to pass comprises drive means connected to said lift gas inlet conduit section so as to move said lift gas inlet conduit section axially within the lower end of said shell.

12. The pebble feeder of claim 10 wherein said means to control the area of each of said passage means through which pebbles are permitted to pass comprises a sleeve slidably engaging the lower end portion of said elevator conduit section; and drive means operatively connected to said sleeve so as to longitudinally displace said sleeve with respect to the upper end of said lift gas inlet conduit section.

13. An improved pebble feeder comprising a closed, upright, elongated shell; pebble inlet means in the upper portion of said shell; elevator conduit means extending longitudinally through said shell; a plurality of inverted T-type openings in the wall of said conduit means within said shell; and control means adapted to controllably restrict the area of said openings available to pebble flow so that pebble flow is restricted to portions of said inverted T-type openings of larger cross section and limited portions of smaller cross section.

14. The pebble feeder of claim 13 wherein constriction means are provided within said conduit means and extend from a level at least as low as the lower ends of said inverted T-type openings to a level at least as high as the upper ends of said openings.

15. The pebble feeder of claim 14 wherein sleeve means encompass at least the upper portion of said elevator means within said shell and being moveable longitudinally with respect to said conduit means so as to progressively restrict the area of said T-type openings open to pebble flow so that pebble flow is through portions of said inverted T-type openings of larger cross section as said sleeve means is positioned at the downward end of its travel and permit flow of additional quantities of pebbles through smaller cross section portions of said inverted T-type openings as said sleeve means is moved upwardly with respect to said conduit means; and means operatively connected to said sleeve means for longitudinally moving said sleeve means.

16. An improved pebble feeder comprising in combination a closed pebble receiving vessel having pebble inlet means in an upper end section thereof; an elevator conduit extending upwardly thru the roof of said vessel from an intermediate level therein; a lift gas inlet conduit coaxial with said elevator conduit and extending downwardly therefrom, both said conduits having axial openings adjacent each other so as to provide a direct axial passageway from one to the other of said conduits, said lift gas inlet being the sole means for introducing lift gas into said elevator conduit; a series of openings from said vessel into said passageway for ingress of pebbles thereto, each of said openings being of a smaller area at one end than the opposite end thereof; and a sleeve member slidable longitudinally relative to said conduits and adapted to progressively and simultaneously reduce the area of each of said openings available to pebble flow into said passageway, the upper end of said sleeve member being disposed above said pebble inlet means, and drive means containing at least one rotary moving part in the operation of which two surfaces slide with respect to each other, all of said rotary moving parts being located outside said closed, elongated shell.

17. An improved pebble feeder comprising in combination a closed pebble receiving vessel having pebble inlet means in an upper end section thereof; an elevator conduit extending upwardly through the roof of said vessel from an intermediate level therein; a lift gas inlet conduit coaxial with said elevator conduit and extending downwardly therefrom, both said conduits having axial openings adjacent each other so as to provide a direct axial passageway from one to the other of said conduits; a series of T-shaped openings from said vessel into said passageway for ingress of pebbles thereto; and a sleeve member slidably engaging one of said conduits and being adapted to progressively and simultaneously reduce and increase the area of each of said openings available to pebble flow into said passageway by being adapted to progressively insert into and withdraw from the pebble flow path selected in areas of said openings.

18. The apparatus of claim 17 wherein said T-shaped openings are inverted and said sleeve is disposed above said openings so that downward adjustment progressively covers the vertical section of the T-shaped openings.

19. The pebble feeder of claim 1 wherein the lower end of said elevator conduit section is of larger diameter than the upper end of said lift gas inlet conduit section.

20. The pebble feeder of claim 19 including an outwardly flared member on the lower end of said elevator conduit section.

(References on following page)

References Cited in the file of this patent

UNITED STATES PATENTS

| | | |
|---|---|---|
| 1,364,532 | Von Porat | Jan. 4, 1921 |
| 2,412,152 | Huff | Dec. 3, 1946 |
| 2,542,887 | Watson | Feb. 20, 1951 |
| 2,630,352 | Degnen | Mar. 3, 1953 |
| 2,649,340 | Weinrich | Aug. 18, 1953 |
| 2,653,058 | Bowen | Sept. 22, 1953 |
| 2,674,496 | Thayer | Apr. 6, 1954 |
| 2,676,142 | Crowley | Apr. 20, 1954 |